Dec. 9, 1947.  F. C. EVANS  2,432,145
FIRE DETECTOR OF THE THERMOCOUPLE TYPE
Filed Dec. 16, 1941  4 Sheets-Sheet 1
FIG. 1
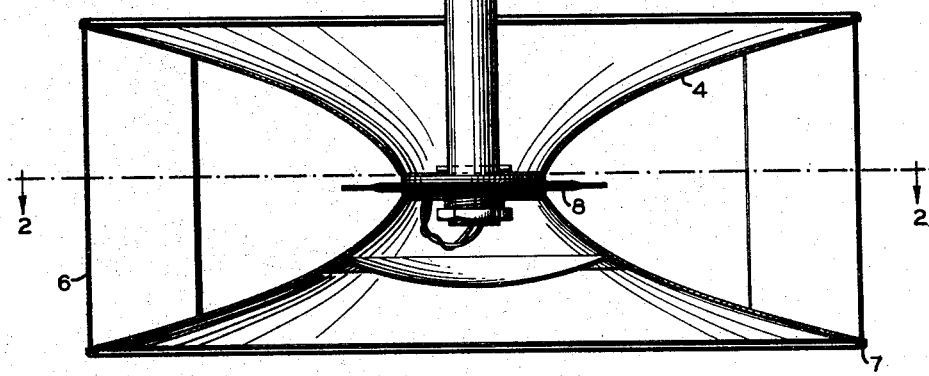
FIG. 2
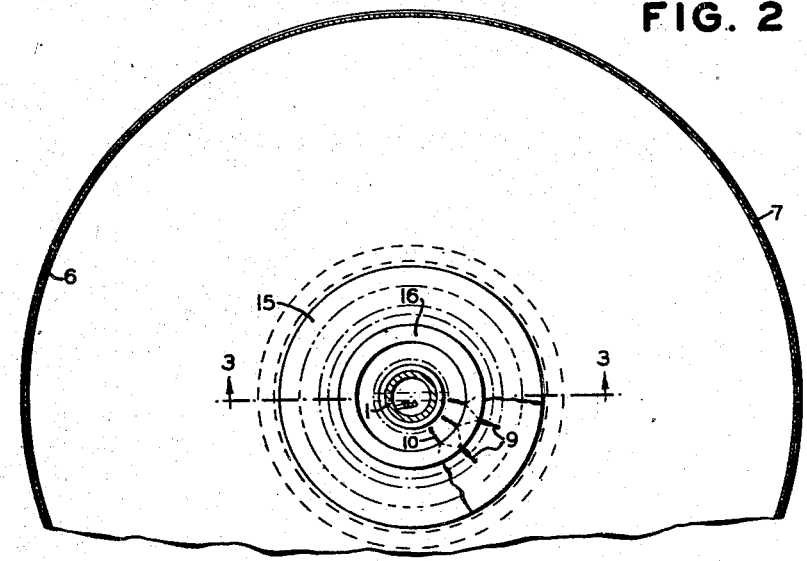
FIG. 3
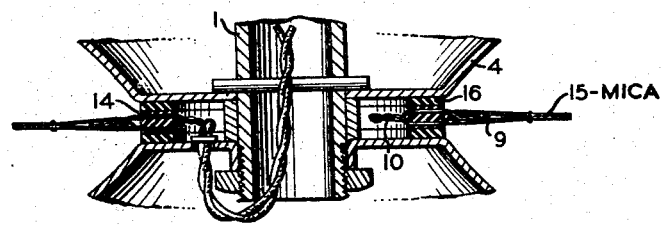
INVENTOR
F. C. EVANS
BY
ATTORNEY

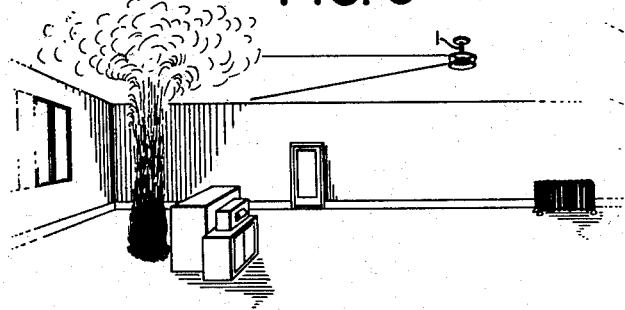
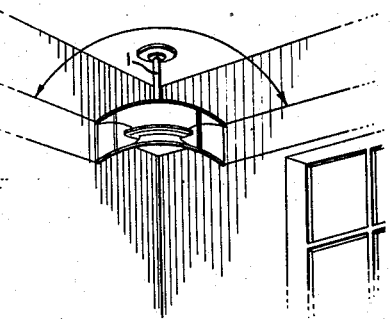
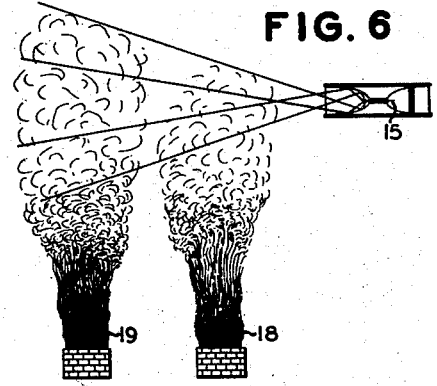
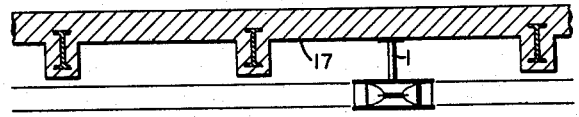
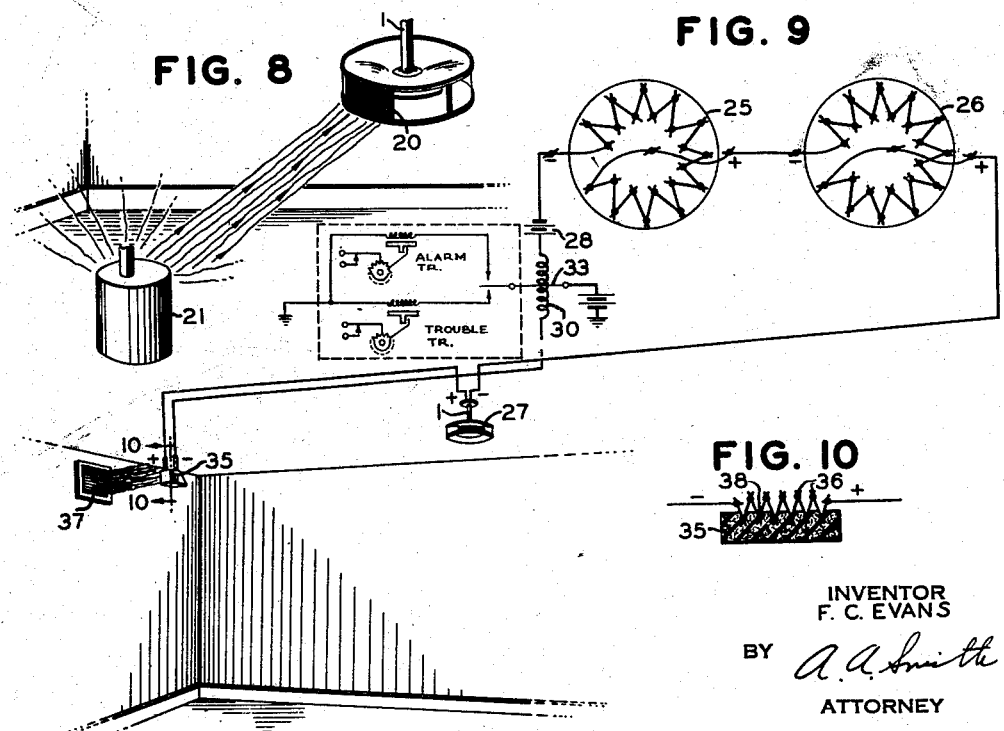

Dec. 9, 1947.  F. C. EVANS  2,432,145
FIRE DETECTOR OF THE THERMOCOUPLE TYPE
Filed Dec. 16, 1941  4 Sheets-Sheet 3

INVENTOR
F. C. EVANS
BY
ATTORNEY

Dec. 9, 1947.　　　　　F. C. EVANS　　　　　2,432,145
FIRE DETECTOR OF THE THERMOCOUPLE TYPE
Filed Dec. 16, 1941　　　4 Sheets-Sheet 4

INVENTOR
F. C. EVANS
BY
ATTORNEY

Patented Dec. 9, 1947

2,432,145

UNITED STATES PATENT OFFICE 2,432,145

FIRE DETECTOR OF THE THERMOCOUPLE TYPE

Francis C. Evans, Dongan Hil's, N. Y., assignor to American District Telegraph Company, Jersey City, N. J., a corporation of New Jersey Application December 16, 1941, Serial No. 423,131

6 Claims. (Cl. 136—4)

This invention relates generally to fire detectors and more particularly to fire detecting devices utilizing a series of thermocouple elements as the detector and signal initiating device.

In the past it has been the practice to detect dangerous temperature changes by means of pneumatic temperature sensitive systems commonly known as aerotube systems or thermostatic devices which comprise bimetallic elements or similar temperature sensitive material for closing electrical circuits and initiating an alarm. These particular fire detectors operate very efficiently in certain enclosures where temperature changes are readily detectable and where the nature of the enclosure renders aerotube circuits or thermostatic elements particularly adaptable. However, great difficulty has been met in economically protecting large enclosures which include large open areas or such areas together with excessive distance from floor to the ceiling or roof. In such enclosures with existing fire detectors, it is necessary to lay out complicated systems which physically extend to substantially all parts of the enclosure whereby temperature changes in local areas of the enclosure may be detected in a sufficiently short time to make it possible to extinguish the fire before it reaches dangerous or uncontrollable proportions. Furthermore, detection of outdoor fires has been extremely difficult, if not actually impossible, with any degree of reliability.

The fire detector which is the subject of this invention is particularly adapted for use in large enclosures and also in outdoor areas where quantities of inflammable materials are collected for storage, for example, yards in which coal, or rubber automobile tires are stored, or similar areas for storage of pulpwood. This invention provides a fire detector which is also particularly advantageous for use in protecting oil storage tanks, freight yards, parking lots, railway sheds, station platforms, shipping docks, airplane hangars, garages, cotton compressors and warehouses, tobacco drying houses, and other similar spaces either indoors or outdoors.

The principal object of this invention is to provide a fire detecting device which has an optical range covering a particularly extensive area to detect the presence of fire therein.

Another object of this invention is to provide a fire detecting device capable of either detecting a fire within its direct optical range or of detecting the existence of hot gases from a fire which may be behind an obstruction with respect to the detector.

Still another object of this invention is to provide a fire detecting device of the above character which may be readily shielded against the effects of sources of safe temperature changes.

A still further object of this invention is to provide a fire detector of the hereinbefore mentioned characteristics which may be readily compensated against the effects of a source of heat energy such as the sun or a heating device.

Still another object of this invention is to provide a heat detecting device capable of either detecting directly a fire or detecting its effects in spite of obstructions existing between the fire and the detector.

Further objects and advantages of this invention will become apparent after an inspection of the following specification taken in connection with the drawings, wherein:

Fig. 1 illustrates the circular thermopile together with a circular reflector;

Fig. 2 is a section of Fig. 1 taken on line 2—2 of Fig. 1;

Fig. 3 is an enlarged view of Figs. 1 and 2 taken on line 3—3 of Fig. 2;

Fig. 4 illustrates a modification of this invention particularly adaptable for operation in the corner of an enclosure;

Fig. 5 illustrates the application of the detector in Fig. 1 in an enclosure where the fire starts behind an obstruction;

Fig. 6 illustrates the fire detector shown in Fig. 1 and the angles of reception with respect to two different fires.

Fig. 7 illustrates the application of the fire detector shown in Fig. 1 to a ceiling having an irregular contour;

Fig. 8 illustrates a method of shielding the fire detector shown in Fig. 1 from a source of heat which might cause safe temperature changes simulating a fire condition;

Fig. 9 illustrates a circuit including a detector unit such as shown in the foregoing figures together with a means for compensating the effects of a source of heat;

Fig. 10 is a cross-section on line 10—10 of the compensator shown in Fig. 9;

Fig. 15 illustrates the fire detector shown in Fig. 1 together with a wiper for removing moisture, dirt, and the like;

Fig. 16 illustrates a modification of the invention as applied to a structure such as an airplane hangar and comprising a circular detector such as shown in Fig. 1 together with a unit such as illustrated in Fig. 12;

Figure 11:
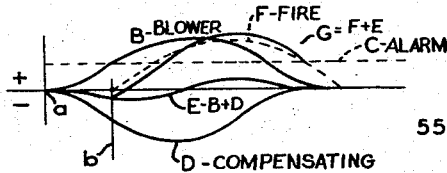
Fig. 11 is a graph showing the effects of the compensator illustrated in Figs. 9 and 10.

The heat detector constructed in accordance with this invention comprises a series of alternately exposed and heat insulated thermocouple junctions having the exposed junctions at the focal line, plane or point of a radiant heat reflector having certain directional characteristics, while the thermally insulated junctions are so located that they are not rapidly affected by radiant heat. Both the exposed and insulated junctions are arranged to be relatively unaffected by heat resulting from convection currents by the provision, in the case of the exposed junctions, of a window of material transparent to radiant heat energy and having the characteristic of blocking convection currents whereby the detector is sealed.

Figs. 1, 2 and 3 of the drawings illustrate the preferred modification of this invention and include a hanger or stand 1 to which the reflector element 4 and the thermocouple 8 are attached. The reflector 4 is circular in form, as shown by Fig. 2, and includes an upper and lower portion formed as shown in the drawing to have a configuration obtained by revolving a parabola about an axis parallel to its directrix and to provide a focal line or circle at which, in any given plane, all horizontal rays of radiant energy are focused. The thermopile element 8 is clamped between the upper and lower halves of reflector 4, as illustrated in Fig. 3, and includes a series of exposed junctions 9 and insulated junctions 10 which are supported in an annular ring 14 between annular washers 16. The exposed thermocouple junctions are at the focal line or circle of the reflector 4 whereby heat rays impinging on reflector 4 collect at the focal points or circle to heat the exposed junctions 9. The thermocouple materials may consist of iron and constantan in round cross-section wire form or in the form of ribbons which have greater heat collecting surfaces in proportion to the product of weight and specific heat. Other materials which can be used are bismuth and bismuth-tin alloy. The reflector may be a brass, steel or iron sheet plated with chromium and polished, or may consist of gold, rhodium, speculum metals, silver, copper, or other polished material well known for its reflecting qualities.

The degree of response of reflector 4 is uniform with respect to incoming rays in the vertical plane regardless of distance between the fire and the detector, but the response of the detector unit varies considerably in the horizontal plane as this distance varies. The overall response is rendered more uniform independently of distance by providing an electrically insulating material 15 having good heat conducting properties, such as mica, and providing intimate heat conducting relation with the exposed thermocouple junctions 9. A more sensitive device is obtained because the focal area is increased so that rays of heat energy at an angle to the horizontal are also detected. The mica is blackened to radiation to provide better reception. Figs. 2 and 3 show a pair of mica discs 15 clamped about the exposed thermocouple junctions for the purpose of collecting heat energy which impinges on the reflectors, as illustrated in Fig. 6. This figure illustrates reception of radiant energy through a wide vertical angle, the size of which depends upon the dimensions of discs 15.

Two similar fires are illustrated and in the horizontal plane the closer fire 18 intercepts a greater angle of vision on the heat collector than the other fire, but the opposite is true in the case of the vertical plane, since the products of combustion from the fire 19 farther from the detector intercept a greater vertical field crossing the ray lines of the detector than the vertical field established by products of combustion from fire 18 (as shown in Fig. 6). Consequently, the net effect is that the detector tends to respond substantially equally to both fires and hence has a substantially uniform response regardless of the distance (within limits) between the detector and the fire.

The detector unit is protected from convection currents by a window 6 which is secured to reflectors 4 in any suitable manner such as by a clamping collar 7. Preferable materials are flexible transparent plastics resembling Celluloid but fire resistant, such as a synthetic resin known as acrylic plastic, an ester of acrylic acid.

When a fire occurs in an enclosure such as illustrated in Fig. 5 of the drawings, the detector unit receives radiant energy directly from the fire if the flames extend into the field of view of the reflectors 4 or a fire which is not directly "seen" by the thermocouple junctions 9 generates heat which rises and spreads in mushroom fashion along the ceiling to subtend a greater horizontal optical angle with respect to the thermopile, whereby radiant energy is reflected from the reflector 4 to the thermocouple junctions 9 in more and more vertical planes. As the exposed junctions 9 become hot with respect to the insulated junctions 10, an electrical potential is generated between each of the hot and cold junctions and since the junctions are serially connected, their potentials add and increase as the heat differential increases and as more junctions become heated by the spread of hot air from the fire. The electrical output of the thermocouple junctions may be utilized to initiate an alarm as will be described later.

The thermocouple as described above presents the advantage that ordinary radiating bodies such as a heating radiator are not optically seen by the detector and therefore have little or no effect on it. But the plume of heated air from the fire collects rapidly and spreads rapidly into the view of the detector and therefore has considerable effect thereon. Another advantage arises from the fact that the transfer of heat from a radiating body to a radiant heat receiver is a function of the absolute temperature of the radiating body to the fourth power minus the absolute temperature of the receiving body to the fourth power. Thus relatively small differences in temperature do not have a very appreciable effect on the thermocouple but greater differences in temperature, such as those produced by fire conditions, have an immediate effect and a rapidly increasing effect whereby the radiant heat detector may be employed in a room having bodies of air with temperatures over wide ranges and yet can maintain very good stability and sensitivity to even comparatively small fires. A further advantage of this type of heat detector is its rate of rise characteristic which results from the fact that the exposed and insulated thermocouples 9 and 10, respectively, oppose each other electrically and, during long slow changes of temperature, neutralize each other. Thus a potential sufficient to initiate an alarm can occur only when the rate of rise of temperature is sufficiently rapid. A still further advantage results from the fact that molecules which comprise the products of combustion are many times better radiators of heat energy than are the simpler, less complex molecules which exist in ordinary air. Thus, this fire detector is selectively affected by warm gases from fires to a greater extent than it is by warm air. Furthermore, warm smoke particles are excellent radiators compared to warm air.

Fig. 4 of the drawings illustrates another advantage of this invention in that a quadrant of the detector such as shown in Fig. 1 is adapted to be supported at a corner between adjacent walls of an enclosure to thus optically see the upper part of an entire room or enclosure. This form of the invention is particularly adaptable to small enclosed areas.

Fig. 7 of the drawings illustrates the application of a detector such as that illustrated in Fig. 1 to a room having a beamed ceiling 17, the area of response of the thermocouple element being below the beams. Thus, instead of requiring some form of usual detecting device in each bay formed by the beams, it is merely necessary to place the thermocouple detector with respect to the beams in such a manner that the plume of heated air rising from the fire will affect the thermocouple as it rises and again as it spills out under a beam or beams, thus multiplying the energy received.

It is frequently necessary to detect a dangerous rise of temperature in an area surrounding a source of radiant heat such as a furnace or oven which creates a condition similar to a fire condition, but the detector constructed in accordance with this invention may be shielded by a shield 20 shown in Fig. 8 which eliminates radiation from a furnace or oven such as 21. The detector still operates to detect a fire, since even a fire in the vicinity of a furnace or over it would cause a rapidly spreading plume of heated air to move into the optical field of the detector to thereby take advantage of the rate of rise characteristics of the detector and initiate an alarm.

Fig. 9 of the drawings illustrates a preferred form of an electrical circuit for use in connection with fire detectors of this particular form. The circuits include the detectors 25, 26 and 27 connected in series with battery 28 and relay 30. Thus, the occurrence of a dangerous rise of temperature increases the potential in the series circuit and causes the relay 30 to move its armature to an alarm position. If a break occurs in the circuit, or any other fault tending to decrease the current therein, relay 30 moves its armature in the opposite direction to a trouble position. This circuit is not limited to use with any particular form of signal transmitter, but for illustrative purposes an alarm transmitter and a trouble transmitter are shown in Fig. 9. These transmitters may be of the type which are actuated electrically, in which case the armature of relay 30 would be operated to close alarm or trouble contacts. It is also feasible to utilize the transmitter shown in Fig. 20 of the drawings, in which case the armature of relay 30 mechanically trips the transmitter in the manner illustrated in the drawing. Three detectors are shown by way of example, it being possible to include many more detectors in an actual circuit.

The circuit also includes a compensating element 35, shown in Figs. 9 and 10, the purpose of which is to compensate the effect of a source of large quantities of radiant energy such as a blower heater or other form of source 37. Blower heaters, steam boiler safety valves on large furnaces, and other sources of heat, frequently emit a large mass of heated air near the ceilings of enclosures in which they are located, thereby simulating a fire condition. The compensator 35 is a thermopile such as shown in Fig. 9 and in cross-section in Fig. 10, the thermopile including a series of bimetallic junctions similar to those shown in Figs. 1, 2 and 3 and comprising, for instance, thermally exposed and insulated junctions 36 and 38 of iron and constantan wires to generate electrical potentials in the usual manner. If a heat condition as from source 37 starts at time $a$, as shown in Fig. 11, and if this condition produces in the fire detecting thermopile a current shown by the curve B, it will be seen that this current reaches and exceeds the dotted line C which represents the operating level at which an alarm initiating value of current is generated. Thus, if the heat condition is not caused by a fire, a false alarm results. When the compensating thermopile 35 is located in such a position that it is affected only by a safe heat condition such as occurs when source 37 operates, and if the compensating thermopile is connected in series and in electrical opposition to the fire detecting thermopile, it produces a current curve D in Fig. 11. When this curve is added algebraically to curve B, then a third curve E is the net resultant current operating on the detecting relay 30. It is thus evident that the safe heat condition is compensated in such a way that no appreciable effect is had upon the fire detecting system as a whole and also in such a way that the response to an actual fire condition, even one starting during the compensating period, is not appreciably affected. This condition is illustrated in Fig. 11 by assuming a fire starting at the time $b$, the dotted line F representing the theoretical normal response to a fire condition in the absence of any compensation factor. It will be noted that the curves B, D and F return from peak to zero illustrating the drop caused by conduction heating of the cold junctions of the thermopile. However, during the compensating period the alarm relay is not affected by this normal response only but is affected by the algebraic sum of this normal response F and the net response E to a heat condition such as caused by a blower operation, thereby creating a net resultant shown by curve G (the algebraic sum of curves F and E) which intercepts the operating current level at only a very short time after the normal response curve. Thus, even if a fire condition starts while the thermopile system is overcompensated, it is still quite sensitive to a fire condition and is even more sensitive than usual if a fire condition starts while the system is undercompensated, i. e., should it start on a portion of the curve E lying above zero.

Figure 12:
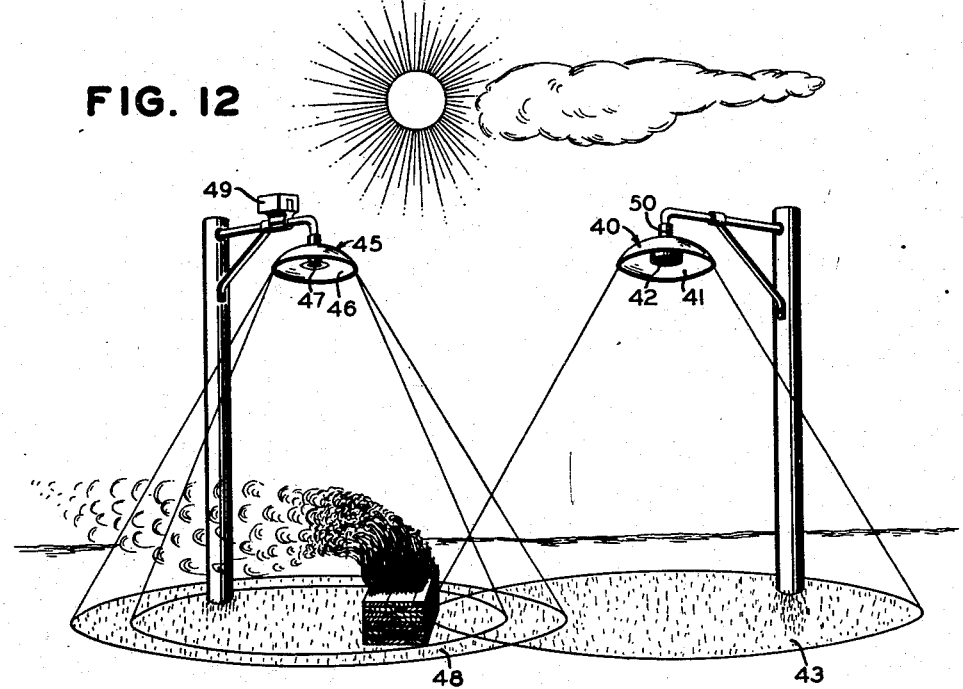
Fig. 12 illustrates a modification of the invention particularly adaptable to outdoor applications.

Inasmuch as the fire detecting thermopile does not depend upon changes of temperature caused by convection currents, it is also effective as an outdoor fire detector and is thus capable of detecting fire conditions in outdoor areas such as lumber yards, freight sheds, rubber, coal and other combustible storage piles, loading platforms and areas surrounding storage warehouses containing highly inflammable materials and requiring protection from fires which might approach externally. Fig. 12 of the drawings illustrates a modification of this invention particularly adapted to detect the existence of fires in outdoor areas such as set forth above. The outdoor units take a different form from the indoor type in that they comprise circular and substantially parabolic envelope reflectors with thermocouple junctions located either at the optical focal point of the reflectors or preferably sufficiently out of focus so that large areas may be supervised. At the right of Fig. 12 a detector 40 is shown having a parabolic reflector 41 for directing heat energy to the thermopile element 42, such as that shown in Figs. 13 and 14, which will be described in detail later on in the description. The thermopile 42 is placed slightly out of focus with respect to reflector 40 so that energy from the entire circular area 43 is received on element 42.

Another form of outdoor fire detector 45 is illustrated at the left of Fig. 12, having a parabolic reflector 46 and a thermopile element 47, such as that shown in Figs. 2 and 3 of the drawings. Thermopile 47 is also slightly out of focus with respect to the parabolic reflector 46 but, since it has a circular heat sensitive element, its area of protection is in the form of a ring 48. The areas protected by elements 40 and 45 are shown as overlapping purely by way of example and regardless of the form of thermopile element, for the purpose of illustrating the method of distributing detector elements in an extensive area. Thus, by overlapping the protected areas, it is possible to substantially completely protect the entire area.

The purpose of the ring 48 is to gain more nearly uniform sensitivity throughout the protected circle which is enclosed by the ring and included directly therein. If a fire occurs, such as that shown in Fig. 12, the hot gases must sooner or later pass through the hollow cone formed by connecting the ring 48 with the thermopile. If the fire is traveling through the area, it will be affecting the thermopile 47 to some extent, and it will affect this thermopile sharply when the heated air passes through the envelope of the cone. On the other hand, if the heat from the same fire travels to the nearer wall of the cone, it would be affecting the less sensitive internal area of the protected circle neither for as long a period nor over as great a subtended angle, but upon passing the conical area it would be much hotter and would affect the thermopile 47 very sharply. It is, therefore, evident that a fire in any portion of the protected circle tends to produce an entirely uniform response regardless of the direction in which the heated air travels with respect to the fire. The thermopile 42 at the right of Fig. 12 is more sensitive to fires at or near the center of the protected area than to fires at the outer edge thereof. This is true as a result of the fact that the effect on the thermopile 42 varies as the inverse square of the distance from the fire to the thermopile, this distance becoming greater with increasing proximity of the fire to the periphery of the protected circle.

The thermopile 47 at the left of Fig. 12 includes a compensator 49 for compensating the effects of temperature changes resulting, for instance, when the sun suddenly emerges from behind a cloud. The compensator 49 is similar to compensator 35 shown in Figs. 9 and 10 and is connected in circuit as shown in Fig. 9. Compensation is necessary in the above instance and many others because of the considerable quantity of radiant energy reflected from the protected areas during sunny intervals. Without compensation the alarm circuit would necessarily be set to be adjusted to be comparatively insensitive in order to overcome such conditions, and thus it would either be very insensitive to fire conditions or would supervise only a very limited protected area. However, by providing the compensator 49 which is affected only by the sun, the effect described above is neutralized to make possible sensitive and stable adjustment of the thermopile 47 whereby it can be very sensitive to comparatively small fires or can supervise very large areas.

Figures 13, 14:
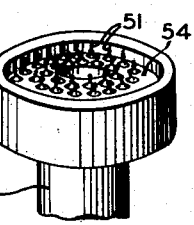
Fig. 13 is a cross-section of the thermopile used in the device illustrated in Fig. 12.
Fig. 14 is a perspective of the thermopile shown in Figs. 12 and 13.

Figs. 13 and 14 illustrate a modification of the thermopile element which is particularly adapted for use in the outdoor detectors shown in Fig. 12. This form of thermopile includes a heat insulating casing 50, a series of thermocouple elements 51 disposed spirally within the casing, the connecting portions of the thermocouples being embedded in electrical insulating material 54, and the concealed or insulated junctions being embedded in cotton or other heat insulating material 55. The exposed junctions 51 of the thermopile are thus supported in a horizontal plane and in a concentrated area to thereby provide a small focal area within the reflectors for reception of radiant energy from the supervised area.

Figures 15, 16:
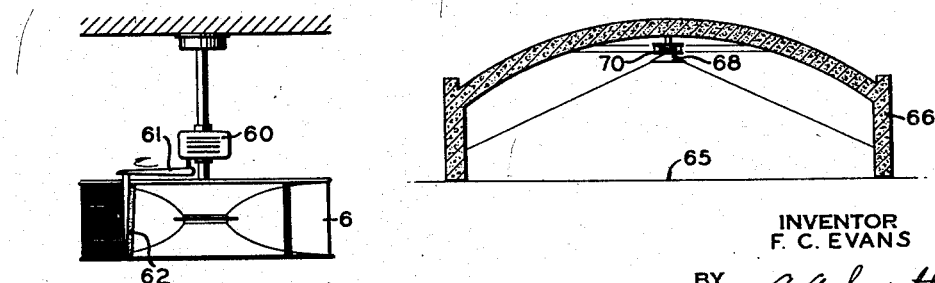

Fig. 15 of the drawings shows a thermopile detector similar to that disclosed in Fig. 1 of the drawings, together with a cleaning device comprising a motor 60, an operating arm 61 and a wiper 62 in engagement with the transparent shield 6. It frequently happens that it is necessary to install fire detecting devices within enclosures having an atmosphere containing large quantities of dust, particles of oil or paint or other foreign material which can coat the shield 6 in such a way that its transparency to radiant heat energy may become seriously reduced. Therefore, a continuously or intermittently operating wiping device maintains the fire detector in such condition that its supervision of the protected area is always effective.

Fig. 16 of the drawings illustrates a combined fire detector including a detector 70 of the type shown in Fig. 1, together with another detector 68 such as shown in Fig. 12. This is especially adapted for use in high ceilinged enclosures such as armories and airplane hangars where considerable time is consumed before the plume of heated air from the fire reaches a level sufficiently high in the building to affect the thermopile 70 such as shown in Fig. 1. Thus, in Fig. 16 a fire occurring on or near the floor 65 of enclosure 66 is immediately seen and detected by detector 68, while a fire occurring in the higher portions of the enclosure 66 is detected by detector 70. Furthermore, the occurrence of a small fire may be more quickly detected, since the plume of heated air issuing therefrom will sooner or later affect both detecting elements, causing their output to add to thereby provide a signal in a comparatively short time.

Figure 18:
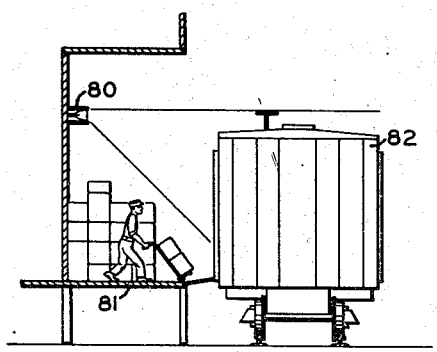
Fig. 18 illustrates the application of the invention to a freight loading platform.
Figure 17:
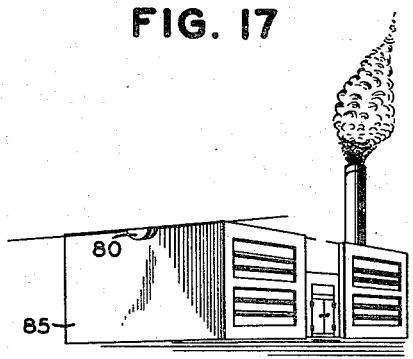
Fig. 17 illustrates the application of the invention to the exterior wall of a building.

Figs. 17 and 18 of the drawings illustrate the use of detectors similar to that shown in Fig. 1 except that they have a 180° angle of response and may be mounted flat against the side of a wall, pointing horizontally or downwardly as desired. Thus, detector 80 in Fig. 18 supervises an area including the loading platform 81 and freight car 82. Thus, the particular form of fire detector disclosed herein makes it possible to supervise not only the fixed enclosure or area but objects or enclosures such as the freight car or other transport vehicles which normally would not be protected by other forms of fire detecting devices. Detector 80 is also shown in Fig. 17 as being directed downwardly to detect a fire either approaching a wall of enclosure 85 or occurring on the wall itself. The particular form of fire detector in this situation serves to protect the entire wall where other forms of detectors could be effective only as to a limited portion of the wall.

Figure 19:
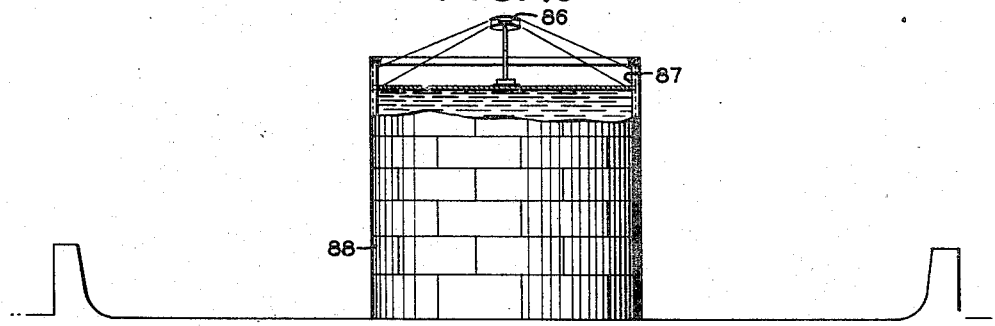
Fig. 19 illustrates the application of the invention to an oil tank.

Fig. 19 illustrates the application of a detector 86 such as shown in Fig. 1 to supervise oil tanks. Detector 86 is preferably modified in that the reflecting elements are shaped to collect energy from a downward angle, as illustrated in Fig. 19, and may thus see the flexible seal 87 at the periphery of the tank 88. Fires are frequently caused by friction or deterioration at the seal 87, and therefore this particular area is a source of danger on oil tanks. It is evident that a fire occurring anywhere on the top of tank 88 will be detected, or a fire occurring in the vicinity of tank 88, causing hot gases to penetrate the protective angle of detector 86, will also be detected. Since detector 86 is floated on the oil tank, it may also supervise a limited area surrounding the tank when the tank is filled.

Figure 20:
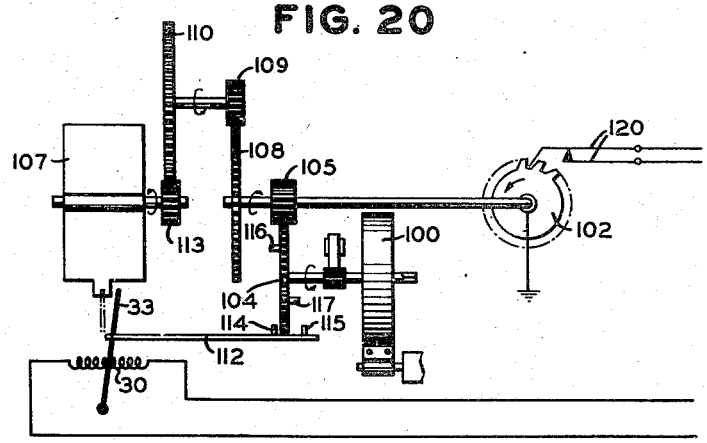
Fig. 20 is a diagram of a transmitter adapted for use in connection with the circuit illustrated in Fig. 9.

Fig. 20 of the drawings illustrates a particular form of transmitter adapted to transmit signals under the control of thermopile alarm circuits. The transmitter includes a spring motor 100 driving contact wheel 102 through gears 104 and 105. Motor 100 also drives a governing fan 107 through the gears 108, 109, 110 and 113, fan 107 being controlled by galvanometer relay 30 shown in Fig. 9. The armature 33 of relay 30 is shown in the position it assumes when energized by an alarm signal. The operating arm 112 connected to armature 33 supports the stops 114 and 115, stop 114 normally engaging stop 116 on gear 104, stop 115 being adapted to engage stop 117 on gear 104 when a trouble condition exists in the alarm circuit shown in Fig. 9. When an alarm signal actuates relay 30, armature 33 assumes the position shown to allow fan 107 to rotate under the influence of motor 100. Contact wheel 102 operates contacts 120 to transmit an alarm signal to the central station, this signal normally comprising five rounds. If a trouble condition exists in the alarm circuit, relay 30 actuates armature 33 to the left, disengaging the stops 114 and 116 and moving stop 115 into position to be engaged by stop 117, which allows transmission of only two rounds of signals to thereby indicate a trouble condition.

It is not intended that the heat detector disclosed in this specification shall be limited to one having a parabolic reflecting element, since the device can operate with increased efficiency in some applications when the received radiant energy is not brought to a sharp focal circle on the thermocouple junctions. Thus, instead of locating the thermocouple junctions out of focus with respect to the reflector, the reflector may be formed to have a configuration slightly different from that of a parabola to obtain the desired result. Furthermore, the reflector need not be constructed of the specific materials recited hereinbefore, as any material is suitable which is capable of reflecting radiant energy with a reasonable degree of efficiency. It is also to be understood that the reflecting element may be modified to comprise whatever desired segment of a circle is necessary in a given application so that the modifications illustrated in Figs. 4, 17 and 18 may be modified to scan or see whatever area is to be protected against fire conditions.

The particular form of thermocouple may be modified to include whatever number of junctions are necessary in the particular circuit in which they are connected, and therefore this invention should not be limited to the particular arrangement illustrated in the drawings. Furthermore, any form of thermocouple is suitable for use in the fire detector described hereinbefore so long as it is capable of receiving radiant energy which has been directed to a focal circle or segment thereof. Indeed, any arrangement for converting received heat energy into electrical energy at this focal circle or segment may be suitable. The materials used in the thermocouple may obviously comprise any suitable materials which are available and which have the characteristic of generating electrical potentials under the influence of radiant heat energy.

I claim:

1. A fire detector comprising a pair of circular reflecting elements in juxtaposition with each other for collecting radiant energy, each of said reflectors being shaped in cross-section to form substantially one-half of a parabola whereby they form substantially a complete parabola in vertical cross-section when joined together at their centers, the composite surface of the joined reflecting elements having a configuration resulting from revolving a parabola about an axis parallel to its directrix, a plurality of thermocouple elements joined together to form concentric circles of thermocouple junctions, supporting means between said reflectors for supporting said thermocouple junctions within the confines of said composite surface and to expose the outer circle of said junctions between the reflectors and to enclose and insulate the inner circle of said junctions whereby the reception of radiant heat energy by said exposed junctions induces flow of electrical current, and a pair of annular heat collecting rings in heat conducting relation with said exposed junctions and in heat collecting relation with said reflectors.

2. A fire detector comprising a circular reflecting surface for collecting radiant energy, the configuration of said surface being obtained by revolving a curve approximating a parabola about an axis parallel to the directrix thereof, a plurality of thermocouple elements joined together to form a circle of thermocouple junctions, supporting means for supporting said thermocouple junctions to expose at least some of said junctions within the space embraced by the reflector and to enclose and insulate alternate junctions whereby the reception of radiant energy by said exposed junctions induces flow of electrical current, and an annular heat collector in heat conducting relation with said exposed junctions and in heat collecting relation with said reflector.

3. A fire detector comprising a circular reflecting element for collecting radiant energy, said reflector having a surface the configuration of which is obtained by revolving a parabola about an axis parallel to its directrix, a plurality of thermocouple elements joined together to form concentric circles of thermocouple junctions, and means for supporting said thermocouple junctions to expose certain of them at the focus of said reflector and to enclose and insulate alternate junctions whereby the reception of radiant energy by said exposed junctions induces flow of electrical current in the thermocouple.

4. A fire detector comprising a reflecting element for collecting radiant energy, said reflector having a surface the configuration of which is obtained by revolving a parabola about an axis parallel to the directrix of said parabola, and a circular heat responsive electrical current generating device at the focus of said reflector.

5. A fire detector comprising a parabolic heat collecting reflector having a configuration resulting from revolving a curve approximating a parabola about an axis and a thermocouple unit supported substantially at the optical focal point of said reflector, said unit comprising a cylindrical supporting member, a plurality of thermocouple junctions electrically connected in series and spirally disposed about the center of said cylindrical support, electrical insulating means surrounding the connecting portions between said thermocouple junctions whereby a certain number of said junctions are disposed in a horizontal plane about the center of said cylinder and near the optical focal point of said reflector, the alternate junctions of said thermocouple unit being enclosed by said cylinder and said insulating material whereby reception of radiant heat energy by said exposed thermocouple junctions causes a flow of electrical current in the thermocouple.

6. A fire detector comprising a parabolic heat collecting reflector having a configuration resulting from revolving a curve approximating a parabola about an axis and a thermocouple unit supported near the optical focal point of said reflector, comprising a supporting member, a plurality of thermocouple hot and cold junctions electrically connected in series and spirally disposed in said support, electrical insulating means surrounding the connecting portions between said thermocouple junctions whereby the hot junctions are disposed in a horizontal plane and near the optical focal point of said reflector, and reception of radiant heat energy by said hot junctions causes a flow of electrical current in the thermocouple.

FRANCIS C. EVANS.

REFERENCES CITED

The following references are of record in the file of this patent:

UNITED STATES PATENTS

| Number | Name | Date |
|---|---|---|
| 2,392,873 | Zahl | Jan. 15, 1946 |
| 235,497 | Bell et al. | Dec. 14, 1880 |
| 2,334,085 | Graves et al. | Nov. 9, 1943 |
| 1,242,499 | Webb | Oct. 9, 1917 |
| 1,343,393 | Hoffman | June 15, 1920 |
| 2,212,211 | Pfund | Aug. 20, 1940 |
| 588,177 | Reagan | Aug. 17, 1897 |
| 660,305 | Oliver | Oct. 23, 1900 |
| Re. 19,564 | Quereau | May 7, 1935 |
| 1,891,039 | Barton | Dec. 13, 1932 |
| 521,168 | Jungner | June 12, 1894 |
| 775,187 | Lyons et al. | Nov. 15, 1904 |
| 1,639,412 | Mechau | Aug. 16, 1927 |
| 2,322,410 | Alfery | June 22, 1943 |
| 989,420 | Reichel | Apr. 11, 1911 |
| 1,526,641 | Mulvaney et al. | Feb. 17, 1925 |
| 1,827,252 | Mollard | Oct. 13, 1931 |
| 1,326,304 | Swan | Dec. 30, 1919 |
| 2,177,493 | Koulichkov | Oct. 24, 1939 |
| 922,320 | Nolen | May 18, 1909 |
| 1,102,666 | Johnson | July 7, 1914 |
| 1,126,199 | Hamilton | Jan. 26, 1915 |

FOREIGN PATENTS

| Number | Country | Date |
|---|---|---|
| 442,007 | Germany | Mar. 17, 1927 |
| 391,428 | Great Britain | July 23, 1931 |

OTHER REFERENCES

King, W. J., Mechanical Eng., vol. 54 (1932), page 494.

Marsh, K., Metals Handbook (1939), page 305.

Harrison et al., Review of Sc. Insts., vol. 12, Jan. 1941, page 29.

Behar, M. F., Instruments, Nov. 1940, page 358.